(12) United States Patent
Sagawa et al.

(10) Patent No.: US 8,028,780 B2
(45) Date of Patent: Oct. 4, 2011

(54) ELECTRIC VEHICLE

(75) Inventors: Kouhei Sagawa, Tokyo (JP); Naoki Watabe, Tokyo (JP); Takahito Shiina, Tokyo (JP); Nobuhisa Yamaguchi, Tokyo (JP); Takashi Tamura, Tokyo (JP); Shingo Ishida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/406,341

(22) Filed: Mar. 18, 2009

(65) Prior Publication Data
US 2009/0242291 A1 Oct. 1, 2009

(30) Foreign Application Priority Data
Mar. 25, 2008 (JP) ................. 2008-078100

(51) Int. Cl.
*B60W 20/00* (2006.01)
*B60K 15/05* (2006.01)
(52) U.S. Cl. ............... 180/65.27; 296/97.22; 903/930
(58) Field of Classification Search ............ 180/65.265, 180/65.27, 65.21, 69.6, 69.4, 69.5; 903/930; 439/299, 300, 34; 296/97.22; 320/109; B60K 15/05
See application file for complete search history.

(56) References Cited

U.S. PATENT DOCUMENTS

| 5,044,678 | A * | 9/1991 | Detweiler | 292/144 |
| 7,451,839 | B2 * | 11/2008 | Perlman | 180/2.1 |
| 2007/0285272 | A1 * | 12/2007 | Umeda et al. | 340/825 |
| 2010/0133024 | A1 * | 6/2010 | Miwa et al. | 180/65.21 |

FOREIGN PATENT DOCUMENTS

| JP | 07192826 A * | 7/1995 |
| JP | 2007-245999 A | 9/2007 |
| JP | 2007290573 A * | 11/2007 |

* cited by examiner

*Primary Examiner* — Paul N Dickson
*Assistant Examiner* — Keith Frisby
(74) *Attorney, Agent, or Firm* — McDermott Will & Emery LLP

(57) ABSTRACT

To ensure that an energy supply operation can be performed safely and smoothly on a vehicle having a plurality of energy ports such as a charging port, charging ports for supplying electric energy to a high voltage battery and a fuel supply port for supplying fuel to a fuel tank are provided in a vehicle body as energy supply ports. The fuel supply port and charging ports are respectively provided with lid members that are switched between a closed state and an open state by respective lock mechanisms. When closure of one lid member is released, all of the other lid members are prohibited from being switched to the open state, and therefore the number of energy supply ports having an open lid member is limited to one.

4 Claims, 7 Drawing Sheets

25 : Fuel supply port
27a to 27c : Lid member
40 : Charging port
43 : Connector
60 : Charging port
62 : Connector
85a to 85c : Open/closed detection switch
87a to 87c : Opening operation member (A)

(B)

(C)

(D)

ELECTRIC VEHICLE

CROSS-REFERENCE TO RELATED APPLICATIONS

The present application claims priority under 35 U.S.C. §119 to Japanese Patent Application No. 2008-078100, filed on Mar. 25, 2008, and which is hereby incorporated by reference herein it its entirety.

BACKGROUND OF THE INVENTION

1. Field of the Invention

The present invention relates to an electric vehicle having a plurality of energy supply ports forming a charging port for supplying electric energy to a battery or a fuel supply port for supplying fuel to a fuel tank, and more particularly to an electric vehicle that controls an opening operation performed on a lock mechanism of a lid member for opening and closing the energy supply port.

2. Description of the Related Art

Vehicles having an electric motor as a drive source include a narrowly defined electric vehicle (EV) having only an electric motor as a power source and a hybrid vehicle (HEV), which serves as a broadly defined electric vehicle having both an electric motor and an internal combustion engine as power sources. In a vehicle (EV) having only an electric motor as a drive source, a charging port is provided to supply electric energy to a battery from the outside. A fast charging port connected to a specialized facility for charging the battery in a short time and a normal charging port connected to a power plug of a residential commercial power source are provided in this type of vehicle (EV) as charging ports. The normal charging port may be provided in a plurality of locations in the vehicle to facilitate a charging operation, whereby one of the plurality of charging ports is selected in accordance with a parking position of the vehicle and the position of the power plug of the commercial power source.

Meanwhile, as described in Japanese Unexamined Patent Application Publication 2007-245999, a vehicle (HEV) having both an electric motor and an internal combustion engine is provided with a fuel supply port for supplying chemical energy that is burned by the internal combustion engine, for example a gasoline engine, and the fuel that is supplied through the fuel supply port is supplied to a fuel tank. A charging port for supplying electric energy to a battery from the outside may be provided in this type of vehicle (HEV). This type of vehicle is known as a plug-in HEV, and may also be provided with a fast charging port and a normal charging port.

In the narrowly defined electric vehicle and the broadly defined electric vehicle described above, a plurality of charging ports and fuel supply ports are provided in the vehicle as energy supply ports. For example, a plug-in vehicle (HEV) is provided with a fuel supply port and at least one charging port. It is therefore necessary to prevent a situation in which a fuel supply operation and a power supply operation are performed on the vehicle at the same time and a situation in which a charging operation is performed through a plurality of charging ports at the same time.

When both the charging port and the fuel supply port are open, a fuel supply operation using highly volatile fuel and a charging operation in which spark generation is possible may be performed at the same time, and it is necessary to prevent such a situation from arising. Further, when charging is performed through a plurality of charging ports at the same time, the battery may be overcharged and the charger may break, and therefore this situation must also be prevented. When a lid member of the charging port is open, a connection terminal of a female side connector provided in the charging port is exposed to the outside, and therefore, when another charging port is opened inadvertently during the charging operation, an operator may touch the connection terminal of the inadvertently opened charging port. Moreover, when the vehicle is provided with a charging port and a fuel supply port, a charging operation may be performed while the fuel supply port is open, and conversely, a fuel supply operation may be performed while the charging port is open.

SUMMARY OF THE INVENTION

An object of the present invention is to ensure that an energy supply operation can be performed safely and smoothly in a vehicle having a plurality of energy supply ports such as a charging port.

An electric vehicle according to the present invention has a plurality of energy supply ports forming a charging port for supplying electric energy to a battery or a fuel supply port for supplying fuel to a fuel tank, lid members for respectively opening and closing the energy supply ports being provided in a vehicle body. The electric vehicle includes: a plurality of lock mechanisms for respectively switching the lid members between a closed state and an open state; opening operation means for releasing closure of the lid member using the lock mechanism; and opening control means for prohibiting remaining lid members from being switched to the open state when closure of one of the lid members has been released. Of the plurality of energy supply ports, the number of energy supply ports simultaneously having an open lid member is limited to one.

In the electric vehicle according to the present invention, the charging port and the fuel supply port are provided in the vehicle body, the opening operation means for releasing the closed state of the lid member provided on the fuel supply port is provided in a vehicle cabin, and the opening control means switch the lock mechanism to the open state when a closure release operation is performed on the lid member of the charging port from a vehicle exterior, whereby the fuel supply port is opened from a vehicle interior and the charging port is opened from the vehicle exterior.

In the electric vehicle according to the present invention, at least one of the plurality of energy supply ports is a charging port, the lid member of the charging port is opened when the lid member is pushed inward, and the lid member is held in the closed state by performing an operation to push the lid member inward from the open state. Further, the electric vehicle according to the present invention also includes a receiver for receiving a signal from a transmitter held by a passenger and transmitting the received signal to the opening control means, wherein opening of the lid member is permitted only when the transmitter is within a signal reception area of the receiver.

According to the present invention, when one supply port is opened in a vehicle having a fuel supply port and a charging port as energy supply ports or a vehicle having a plurality of charging ports as energy supply ports, opening of the other supply ports is prohibited. Hence, in an electric vehicle in which an electric motor and an engine are installed as drive sources, a situation in which a fuel supply operation to a fuel tank and a power supply operation to a battery are performed simultaneously is prevented from occurring. Further, when one charging port is opened in an electric vehicle having only an electric motor as a drive source and a plurality of charging ports, opening of another charging port is prohibited, and therefore a situation in which a charging operation is performed through a plurality of charging ports at the same time and a situation in which another charging port is opened inadvertently during a charging operation are prevented from occurring. As a result, an energy supply operation can be performed safely and smoothly on a vehicle having a plurality of energy supply ports such as a charging port.

DESCRIPTION OF THE PREFERRED EMBODIMENTS

Figure 1:
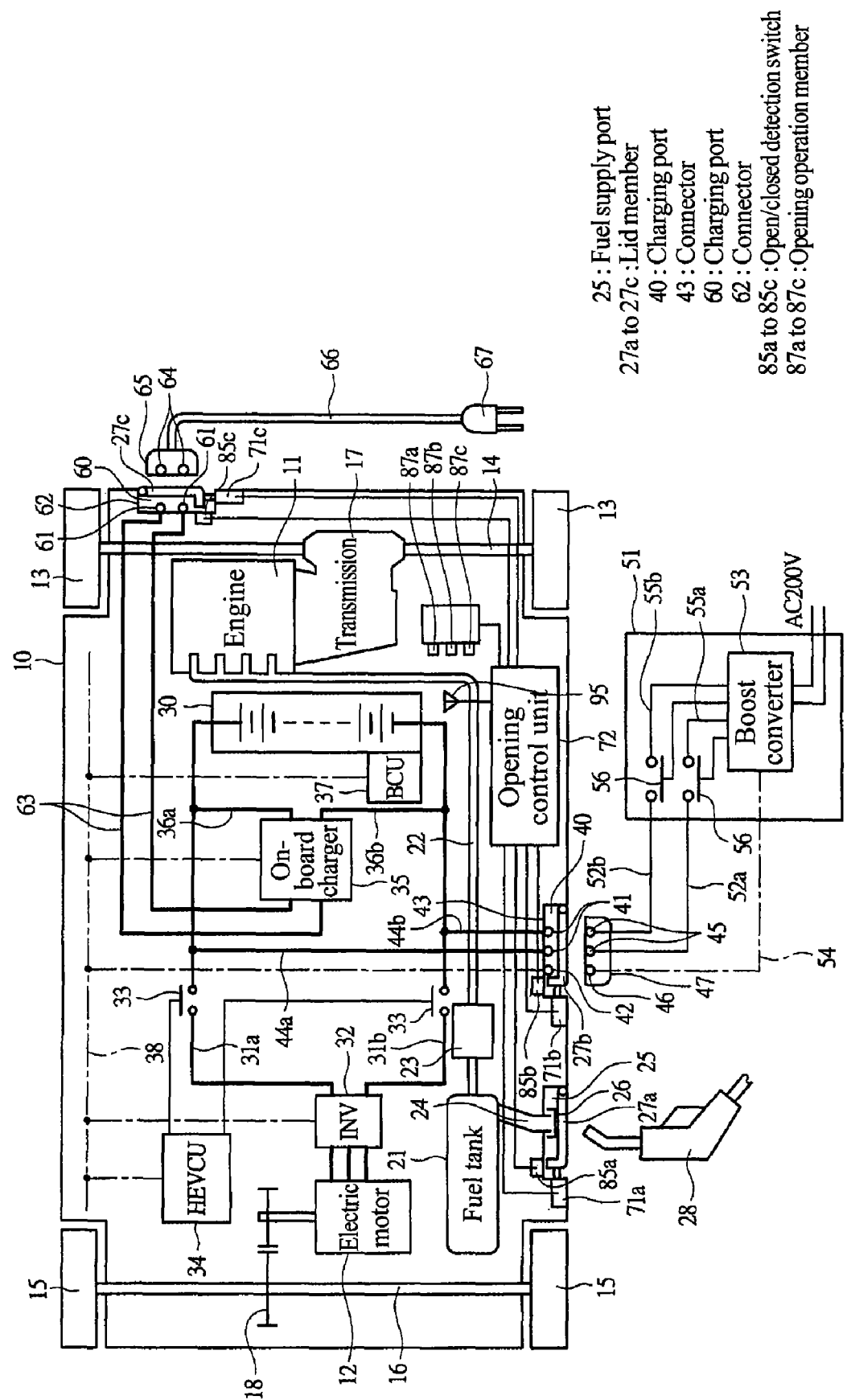
FIG. 1 is a schematic diagram showing an electric vehicle serving as an embodiment of the present invention.

Embodiments of the present invention will be described in detail below on the basis of the drawings. FIG. 1 is a schematic diagram showing an electric vehicle serving as an embodiment of the present invention.

First Embodiment

An engine 11 and an electric motor 12 are installed in a vehicle body 10 as drive sources, and the vehicle is a hybrid vehicle serving as a broadly defined electric vehicle. The vehicle is driven by the driving force of one or both of the engine 11 and the electric motor 12 depending on the travel conditions of the vehicle. The vehicle body 10 is provided with a drive shaft 14 for driving front wheels 13 and a drive shaft 16 for driving rear wheels 15. Accordingly, the driving force of the engine 11 is transmitted to the front wheels 13 via a transmission 17 and the drive shaft 14, whereas the driving force of the electric motor 12 is transmitted to the rear wheels 15 via a gear pair 18 having a fixed gear ratio and the drive shaft 16.

A fuel tank 21 housing fuel that serves as chemical energy supplied to the engine 11 is installed in the vehicle body 10. To supply the fuel, which serves as an energy source that is housed in the fuel tank 21 and burned by the engine, to the engine 11, the fuel in the fuel tank 21 is supplied to the engine 11 by a pump 23 provided on a fuel supply pipe 22. When the engine 11 is a gasoline engine, gasoline is housed in the fuel tank 21, and when the engine 11 is a diesel engine, light oil is housed in the fuel tank 21.

A fuel injection pipe 24 is provided in the fuel tank 21, and the fuel injection pipe 24 opens onto a fuel supply port 25 formed in a side face of the vehicle body 10 as an energy supply port. A tank cap 26 is attached detachably to a tip end of the fuel injection pipe 24, and a lid member 27a is attached to the vehicle body 10 openably to open and close the fuel supply port 25. When fuel is supplied to the fuel tank 21 at a service station, the lid member 27a is opened and the tank cap 26 is removed, whereupon a fuel supply nozzle 28 is inserted into the fuel supply port 25.

The electric motor 12 is a three-phase alternating current synchronous motor, and a high voltage battery 30 for supplying electric energy thereto is installed in the vehicle body 10 as a battery. The high voltage battery 30 is a lithium ion battery, i.e. a secondary battery, and outputs 400V of direct current power, for example. The high voltage battery 30 is connected to an inverter 32 via power supply cables 31a, 31b. The inverter 32 converts a direct current from the high voltage battery 30 into a three-phase alternating current and supplies power to the electric motor 12.

The power supply cables 31a, 31b are provided with a main relay 33 for switching the high voltage battery 30 and the inverter 32 between a connected state and a disconnected state. The main relay 33 performs a switching operation in accordance with a drive signal from a vehicle control unit (HEVCU) 34.

An on-board charger 35 is installed in the vehicle body 10 so that the high voltage battery 30 can be charged from an external power source such as a commercial power source, and an output terminal of the on-board charger 35 is connected to the high voltage battery 30 via the power supply cables 31a, 31b by output cables 36a, 36b. The on-board charger 35 charges the high voltage battery 30 by boosting the voltage of an AC 100V or AC 200V external power source, for example, and converting this voltage into a 400V direct current, for example. A battery control unit (BCU) 37 is connected to the high voltage battery 30. The vehicle control unit 34 is connected to the battery control unit 37, the on-board charger 35, and the inverter 32 by a communication network 38, or in other words a CAN, whereby information can be exchanged. Information such as the voltage and remaining capacity of the high voltage battery 30, for example, is transmitted to the vehicle control unit 34 by the communication network 38.

A fast charging port 40 is provided on a side face of the vehicle body 10 as an energy supply port, and a connector 43 having connection terminals 41 and a signal terminal 42 is provided in the interior of the charging port 40. The connection terminals 41 are directly connected to the power supply cables 31a, 31b by respective power supply cables 44a, 44b, while the signal terminal 42 is connected to the vehicle control unit 34 via the communication network 38. A lid member 27b is attached to the vehicle body 10 openably for opening and closing the charging port 40. When the lid member 27b is open, a power supply plug 47 having power supply terminals 45 connected respectively to the connection terminals 41 and a signal terminal 46 connected to the signal terminal 42 is attached detachably to the connector 43.

The power supply terminals 45 of the power supply plug 47 are connected to output terminals of a fast charger 51 serving as an external charger via power supply cables 52a, 52b, and the fast charger 51 includes a boost converter 53 that boosts an alternating current supplied from an external power source and converts the boosted alternating current into a 400V direct current, for example. The signal terminal 46 of the power supply plug 47 is connected to the boost converter 53 by a signal line 54. When the power supply plug 47 is attached to the connector 43, a signal is transmitted to the vehicle control unit 34 via the signal line 54 and the communication network 38, and relays 56 provided on output lines 55a, 55b of the boost converter 53 are operated by a signal from the vehicle control unit 34 such that charging is performed on the high voltage battery 30 by the fast charger 51. Hence, to charge the high voltage battery 30 using the charging-dedicated fast charger 51 provided in a service station, the power supply plug 47 is connected to the connector 43 after opening the charging port 40 using the lid member 27b. As a result, charging is performed on the high voltage battery 30 from the external fast charger 51.

A normal charging port 60 is provided in a front end portion of the vehicle body 10 as an energy supply port, and a connector 62 having connection terminals 61 is provided in the interior of the charging port 60. The connection terminals 61 are respectively connected to the on-board charger 35 by power supply cables 63. To open and close the charging port 60, a lid member 27c is attached openably to the vehicle body 10, and when the lid member 27c is open, a power plug 65 having power source terminals 64 connected respectively to the connection terminals 61 is attached detachably to the connector 62. The power plug 65 is connected to a connection plug 67 via a power supply cable 66, and the connection plug 67 is attached detachably to an external power source terminal, not shown in the drawing. Hence, to charge the high voltage battery 30 from a residential commercial power source, the power plug 65 is connected to the connector 62 after opening the charging port 60 using the lid member 27c, and the connection plug 67 is connected to an external commercial power source terminal, or in other words a normal charging power source. As a result, power is supplied to the on-board charger 35 from the outside, and charging is performed on the high voltage battery 30 by the on-board charger 35.

As shown in FIG. 1, the fuel supply port 25 and the fast charging port 40 are provided on the right side face of a rear end portion of the vehicle body 10, but may be provided on the opposite side face, i.e. the left side face. Further, the fuel supply port 25 and the fast charging port 40 are respectively provided in a single location of the vehicle body 10. As shown in FIG. 1, the normal charging port 60 is provided in a front end portion of the vehicle body 10, but may be provided in the rear end portion and on either the left side face or the right side face. Further, the normal charging port 60 may be provided in a plurality of locations of the vehicle body 10, for example the front, rear, left and right of the vehicle body 10, such that one of the plurality of charging ports 60 can be selected. In so doing, a normal charging operation can be performed more easily.

To maintain the three lid members 27a to 27c shown in FIG. 1 in a closed state, respective lock mechanisms 71a to 71c are provided on the vehicle body 10. The respective lock mechanisms 71a to 71c are operated in accordance with a signal from an opening control unit 72 provided in the vehicle body 10 as opening control means. The vehicle control unit 34, battery control unit 37, and opening control unit 72 include a CPU for calculating control signals, a ROM for storing a control program, calculation equations, map data and so on, and a RAM for storing data temporarily.

Figure 2:
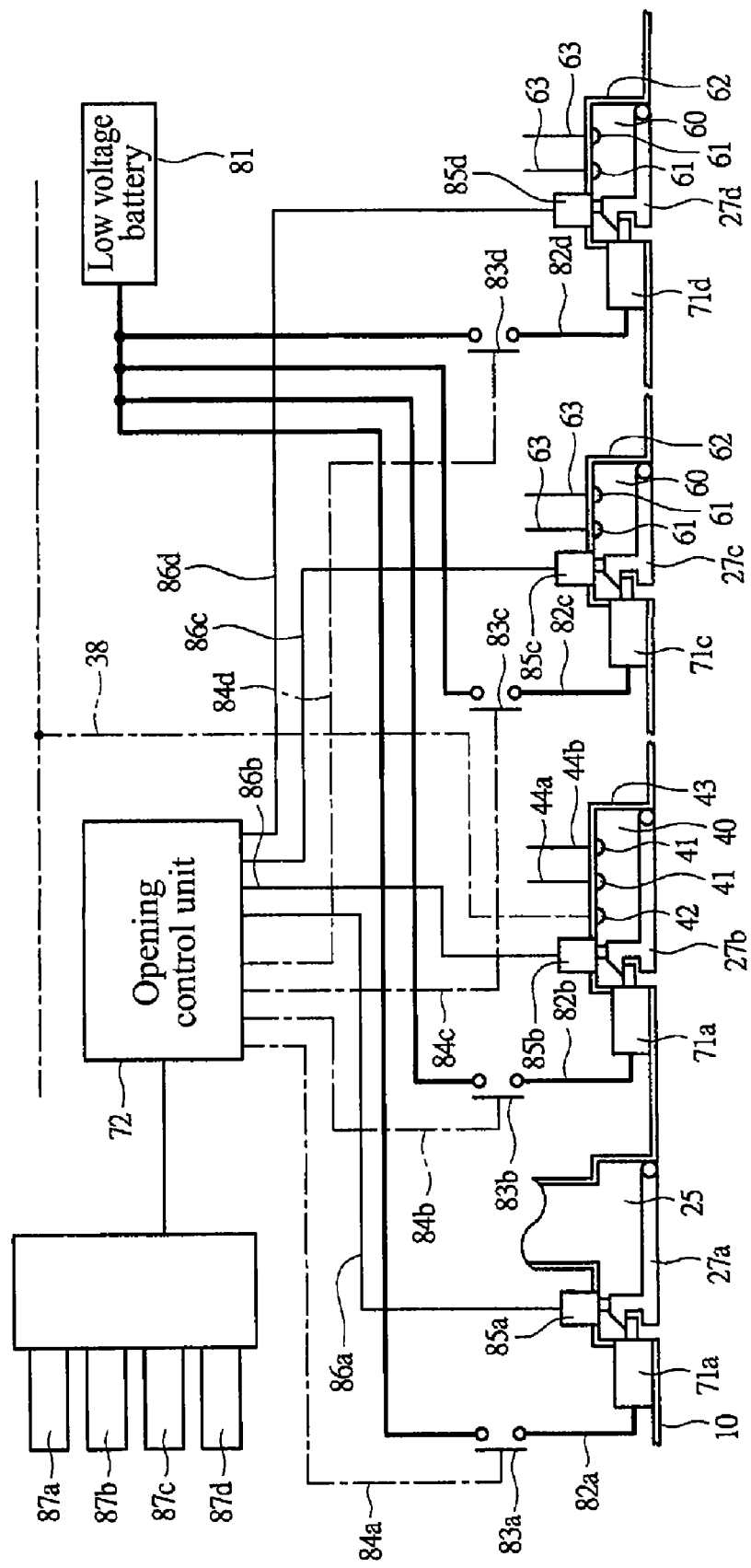
FIG. 2 is a schematic diagram showing a connection state between a lock mechanism and an opening control unit shown in FIG. 1.

FIG. 2 is a schematic diagram showing a connection state between the lock mechanisms shown in FIG. 1 and the opening control unit. FIG. 2 shows a case in which two normal charging ports 60 are provided in the vehicle body 10, the respective charging ports 60 having an identical structure. Hence, the fuel supply port 25 and three charging ports 40, 60, 60 are provided in the vehicle body 10 shown in FIG. 2 as energy supply ports, and lid members 27a to 27d are provided openably on the respective energy supply ports. When two or more normal charging ports 60 are provided in the vehicle body 10 in this manner, the charging ports 60 are distributed over the front, rear, left and right of the vehicle body 10.

Figure 3:
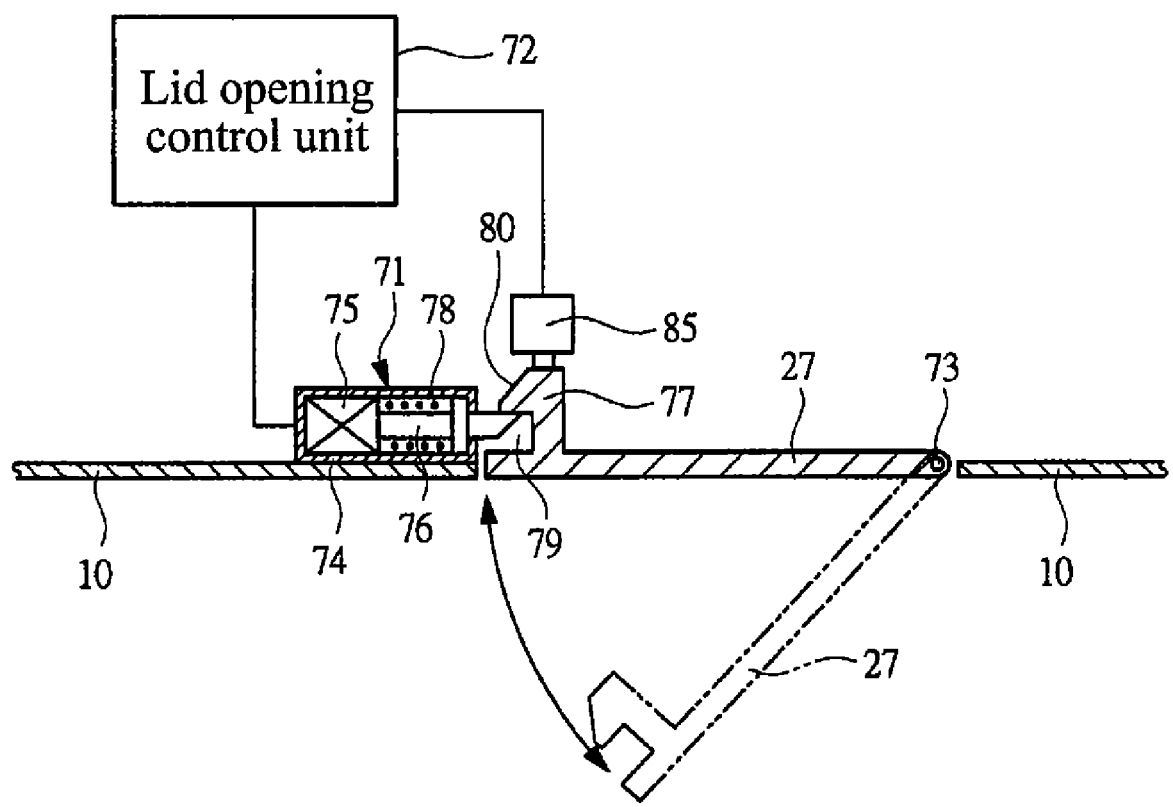
FIG. 3 is an enlarged sectional view showing one of the lid members shown in FIG. 2.

FIG. 3 is an enlarged sectional view showing one of the four lid members 27a to 27d shown in FIG. 2. The lid members 27a to 27d have a common structure, and therefore, in FIG. 3, the reference numeral 27 denotes the lid member. Similarly, the lock mechanisms 71a to 71d have a common structure, and therefore, in FIG. 3, the reference numeral 71 denotes the lock mechanism.

As shown in FIG. 3, the lid member 27 is attached to the vehicle body 10 openably about a hinge 73, and a spring force, not shown in the drawing, is applied to the lid member 27 in a direction for opening the lid member 27. The lock mechanism 71 includes a coil 75 incorporated into a case 74, and a lock rod 76 constituted by a moving core is incorporated into the coil 75 to be free to move in an axial direction. An engaging pawl 77 that engages with the lock rod 76 is provided on the inside of the lid member 27, and in the case 74, a forward direction spring force oriented toward the engaging pawl 77 is applied to the lock rod 76 by a coil spring 78. When the lock rod 76 engages with the engaging pawl 77, a tip end portion of the lock rod 76 enters a recess portion 79 provided on the inside of the lid member 27. Hence, when the lid member 27 is pushed closed against the spring force applied to the lid member 27 while the lid member 27 is open, as shown by a dot-dot-dash line in FIG. 3, and electrification of the coil is halted, an inclined surface 80 formed on a tip end of the engaging pawl 77 contacts the lock rod 76 such that the lock rod 76 is caused to retreat against the spring force. When the lid member 27 is closed, the lock rod 76 is moved forward by the spring force so as to enter a groove in the interior of the engaging pawl 77. As a result, the lid member 27 is closed and locked by the engagement between the lock rod 76 and the engaging pawl 77.

The coils 75 of the respective lock mechanisms 71a to 71d shown in FIG. 2 are connected to a low voltage battery 81 by power lines 82a to 82d, and 12V of power, for example, are supplied to each of the coils 75. The power of the high voltage battery 30 is reduced in voltage by a DC/DC converter, not shown in the drawings, and then supplied to the low voltage battery 81. Power from the low voltage battery 81 is supplied to low voltage devices such as the vehicle control unit 34. Normally open relays 83a to 83d are provided respectively on the power lines 82a to 82d, and the respective relays 83a to 83d are opened and closed in accordance with a drive signal transmitted from the opening control unit 72 by signal lines 84a to 84d. Open/closed detection switches 85a to 85d are provided in the vehicle body 10 to detect whether or not the respective lid members 27a to 27d are closed, and detection signals from the open/closed detection switches 85a to 85d are transmitted to the opening control unit 72 by signal lines 86a to 86d. Note that in FIG. 3, the open/closed detection switches 85a to 85d are denoted by the reference numeral 85.

Three opening operation members 87a to 87c corresponding to the three lid members 27a to 27c shown in FIG. 1 are provided in the vehicle body 10 as opening operation means, and the respective opening operation members 87a to 87c are formed from push button switches, for example. When the opening operation member 87a is operated, the relay 83a corresponding to the lid member 27a of the fuel supply port 25 is operated by a signal transmitted from the opening control unit 72, whereby power is supplied to the coil 75 of the lock mechanism 71a. As a result, the lock rod 76 of the lock mechanism 71a retreats, thereby releasing the closed state of the lid member 27a such that the lid member 27a is opened by the spring force. A fuel supply operation can then be performed on the fuel tank 21.

When the opening operation member 87b is operated, on the other hand, the lid member 27b of the fast charging port 40 is switched from a closed state to an open state, and when the lid member 27b is open, a charging operation can be performed by the fast charger 51. Similarly, when the opening operation member 87c is operated, the lid member 27c of the normal charging port 60 is opened such that a charging operation can be performed via the residential commercial power source. When two normal charging ports 60 are provided in the vehicle body 10, as shown in FIG. 2, opening operation members 87c, 87d are provided in accordance with the lid members 27c, 27d provided on the respective charging ports 60. When a plurality of normal charging ports 60 is provided, one of the charging ports 60 can be selected in accordance with the parking position of the vehicle or the position of the commercial power source terminal, and the charging operation can be performed from the selected charging port 60.

As shown in FIGS. 1 and 2, the vehicle body 10 is provided with a plurality of energy supply ports. When one of the lid members for opening and closing the respective energy supply ports is opened by operating the opening operation member, opening operations of the lid members corresponding to the other opening operation members are prohibited, even when one of the other opening operation members is operated.

For example, when the opening operation member 87a is operated by a driver during fuel supply to the fuel tank 21, a signal is transmitted from the opening operation member 87a to the opening control unit 72. As a result, a signal is transmitted from the opening control unit 72 to the relay 83a, whereby power is supplied to the coil 75 of the lock mechanism 71a, causing the lock rod 76 to retreat such that the lock on the lid member 27a is released. When the lid member 27a is opened in this manner, an operation is performed to inject fuel into the fuel tank 21. At this time, power supply from the opening control unit 72 to the relays corresponding to the other lock mechanisms is prohibited, even when one of the other opening operation members is operated inadvertently. Similarly, when the lid member of one of the charging ports is open, opening of the lid member 27a of the fuel supply port 25 is prohibited. Hence, when closure of a single lid member is released, all of the other lid members are prohibited from being switched to an open state.

Thus, a fuel supply operation and a charging operation are prevented from being performed simultaneously on the vehicle. Furthermore, when one lid member of the plurality of charging ports 40, 60 is open, opening of another lid member is prohibited. Therefore, simultaneous charging operations from a plurality of charging ports are prevented, and inadvertent opening of another charging port during a charging operation is prevented.

All of the opening operation members 87a to 87d described above take the form of push button switches, but levers may be used as the opening operation members 87a to 87d.

Figure 4:
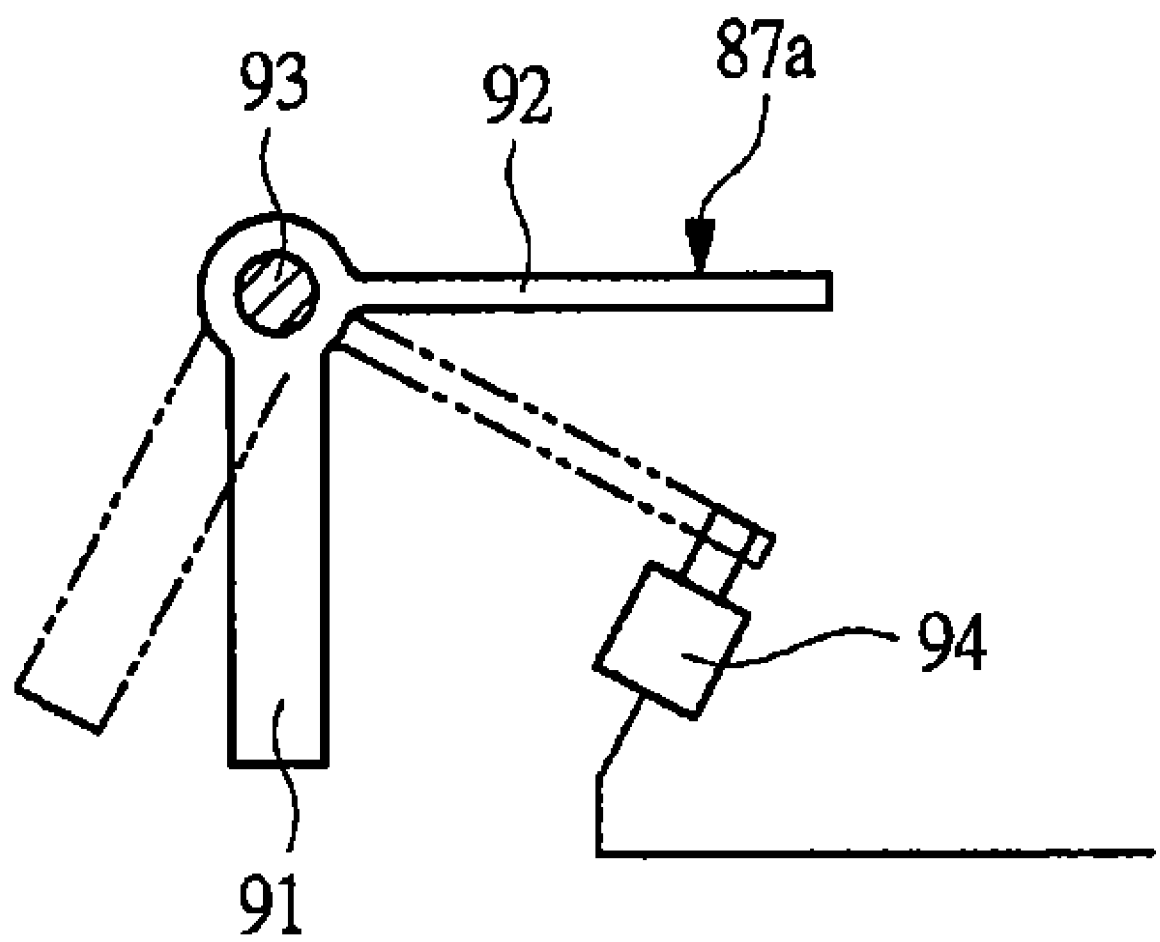
FIG. 4 is a sectional view showing a lever system opening operation member.

FIG. 4 is a sectional view showing a lever system opening operation member 87a. The opening operation member 87a includes a manipulation portion 91 and an operation portion 92, which is formed integrally with the manipulation portion 91 and bent relative to the manipulation portion 91, and is attached to the vehicle body 10 to be free to rotate about the hinge 93. A spring force, not shown in the drawing, is applied to the opening operation member 87a to return the opening operation member 87a to a normal position shown by a solid line. When the opening operation member 87a is rotated against the spring force by gripping the manipulation portion 91 by hand, the rotation operation is detected by a limit switch 94 and a detection signal is transmitted to the opening control unit 72.

An opening control device having a lever system opening operation member includes a device in which only the opening operation member 87a used to open the lid member 27a of the fuel supply port 25 is operated by a lever and the other opening operation members 87b to 87d are operated by push buttons, and a device in which all of the opening operation members 87a to 87d are operated by levers. When the lid member 27a of the fuel supply port 25 is opened by a lever, the lever system opening operation member 87a may be connected to the lock mechanism 71a by a wire or the like such that an operation of the opening operation member 87a is performed mechanically via the wire or the like. In this case, a mechanism is provided to halt interlocking of the opening operation member 87a and lid member 27a when a charging port is open.

Figure 5:
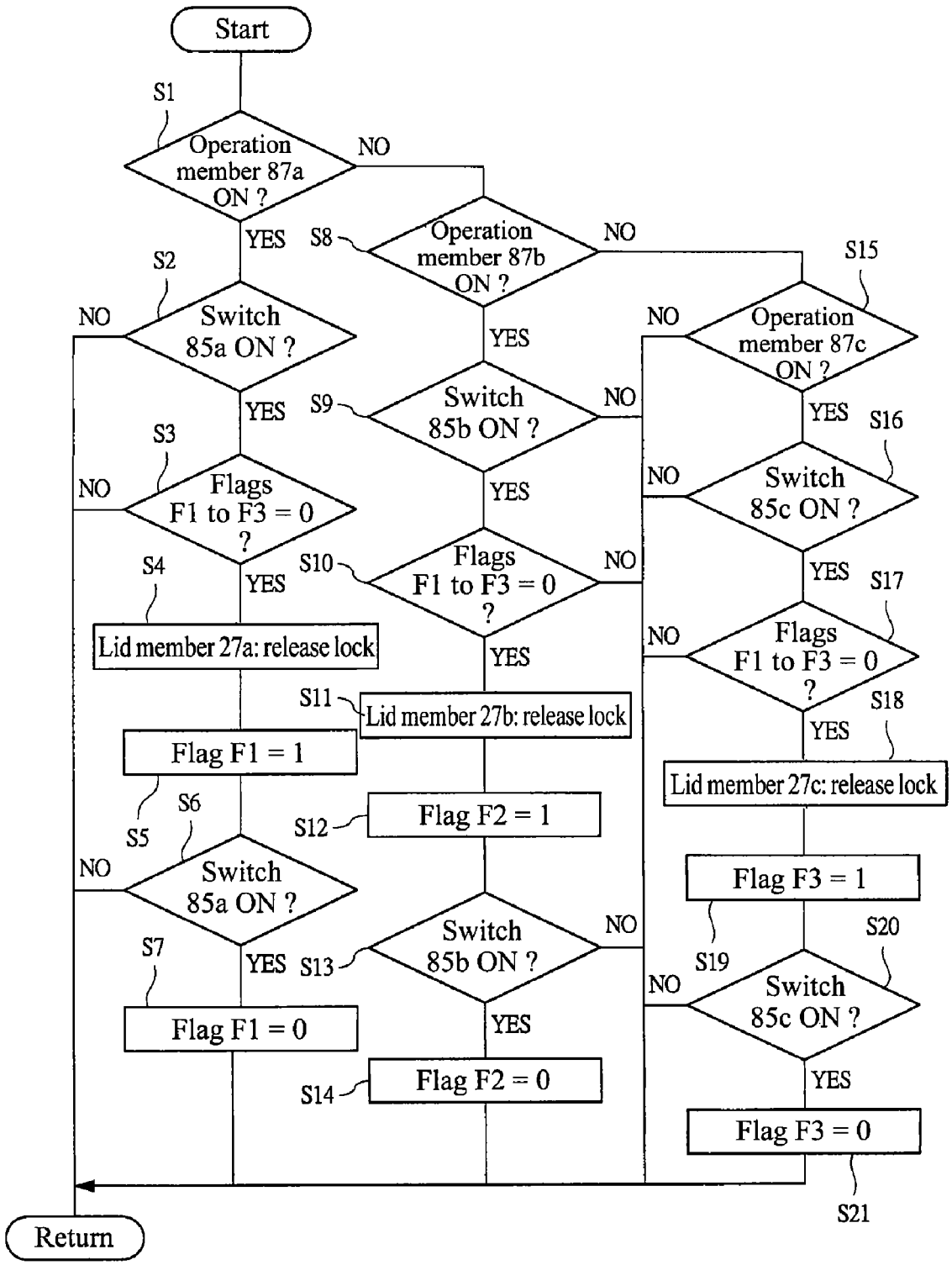
FIG. 5 is a flowchart showing an algorithm for releasing closure of the lid member shown in FIG. 1.

FIG. 5 is a flowchart showing an algorithm for releasing closure of the lid members 27a to 27c in an electric vehicle having the fuel supply port 25 and the two charging ports 40, 60, as shown in FIG. 1. When a passenger operates the opening operation member 87a in the vehicle cabin to open the fuel supply port 25, it is determined in a step S1 that the opening operation member 87a has been operated, and in a step S2, a determination is made as to whether or not the open/closed detection switch 85a corresponding to the opening operation member 87a has been switched ON by the lid member 27a. When it is determined in the step S2 that the open/closed detection switch 85a is ON, a determination is made as to whether or not open flags F1 to F3 corresponding respectively to the lid members 27a to 27c are all at 0, or in other words whether or not all of the lid members 27a to 27c are closed. The flags are set respectively at 0 when the lid members are closed, and when the lid members are opened, the flags are raised and set at 1.

When all of the lid members 27a to 27c are closed, YES is determined in a step S3, and in a step S4, power is supplied to the coil 75 of the lock mechanism 71a maintaining the lid member 27a in a closed state such that the lock on the lid member 27a is released. The flag F1 is then set at 1 in a step S5. Hence, when all of the lid members 27a to 27c are closed, the closed state of the lid member 27a is released only upon operation of the opening operation member 87a, whereby the lid member 27a is opened by the spring force such that the fuel supply port opens. When an operation to inject fuel through the open fuel supply port 25 is complete and the operator closes the lid member 27a, the open/closed detection switch 85a is switched ON by the lid member 27a. When it is determined in a step S6 that the open/closed detection switch 85a is ON, the flag F1 is set at 0 in a step S7.

When the passenger operates the opening operation member 87b in the vehicle cabin to open the fast charging port 40, on the other hand, it is determined in a step S8 that the opening operation member 87b has been operated, whereupon steps S9 to S14 are executed. Hence, the lid member 27b is opened, thereby opening the charging port 40, only when the opening operation member 87b is operated while all of the lid members 27a to 27c are held in a closed state.

Further, when the passenger operates the opening operation member 87c in the vehicle cabin to open the normal charging port 60, it is determined in a step S15 that the opening operation member 87c has been operated, whereupon steps S16 to S21 are executed. Hence, the lid member 27c is opened, thereby opening the charging port 60, only when the opening operation member 87c is operated while all of the lid members 27a to 27c are held in a closed state.

Second Embodiment

FIGS. 6A to 6D are sectional views showing a procedure for opening and closing a lid member in an electric vehicle according to another embodiment of the present invention.

In the electric vehicle described above, the lid members are all opened by operating the opening operation members 87*a* to 87*d* provided in the vehicle cabin. In the embodiment shown in FIG. 6, on the other hand, the lid member 27*a* of the fuel supply port 25 is opened by the push-button system or lever system opening operation member 87*a* provided in the vehicle cabin, as described above, whereas the lid members 27*b*, 27*c* for opening and closing the charging ports 40, 60 are opened by an operation performed from the exterior of the vehicle. Note that when a plurality of normal charging ports 60 is provided, the respective charging ports 60 are opened in a similar manner. The lid members 27*b*, 27*c* have a common structure, and therefore, in FIG. 6, the reference numeral 27 denotes the respective lid members 27*b*, 27*c*, the reference numeral 85 denotes the respective open/closed detection switches 85*b*, 85*c*, and the reference numeral 71 denotes the respective lock mechanisms 71*b*, 71*c*.

FIG. 6A shows a state in which the charging port is closed by the lid member 27. The recess portion 79 is formed to be larger than a width dimension of the lock rod 76, and therefore, when the lid member 27 is pushed inward within the range of a gap between the lock rod 76 and the recess portion 79 while the charging port is closed, the open/closed detection switch 85 is activated as shown in FIG. 6B. When a signal from the open/closed detection switch 85 is transmitted to the opening control unit 72, power is supplied from the opening control unit 72 to the coil 75 of the lock mechanism 71, causing the lock rod 76 to retreat, as shown in FIG. 6B, whereby the lock on the lid member 27 is released by the lock mechanism 71. As a result, the lid member 27 is opened by the spring force of a spring member not shown in the drawings, as shown in FIG. 6C. When closure of one of the lid members 27 is released in this manner, operations to release closure of the other lid members are prohibited, similarly to the case described above.

To close the open lid member 27, a closing operation is performed by pushing the lid member 27 inward, as shown in FIG. 6D. When this pushing operation is performed on the open lid member 27, the open/closed detection switch 85 is activated on the basis of a state in which the opening control unit 72 has determined that the lid member 27 is open, and therefore the power supply to the coil of the lock mechanism 71 is halted by a signal from the open/closed detection switch 85. Thus, the lock rod 76 is caused to advance by the spring force such that the lock rod 76 engages, or in other words meshes, with the engaging pawl 77. When the pushing operation applied to the lid member 27 is halted, the lid member 27 is set in the closed position shown in FIG. 6A by the spring force. Hence, when an opening operation is performed on the lid member 27 from the exterior of the vehicle by directly pushing the lid member 27, the opening operation can be performed on the lid member 27 easily. As shown in FIG. 6B, the engaging pawl 77 is formed with the inclined surface 80, and therefore the lid member 27 can also be closed by halting electrification of the coil 75 to cause the lock rod 76 to project after the lock rod 76 has retreated such that the lock on the lid member 27 is released by the lock mechanism 71 and the lid member 27 is opened.

Figure 6:
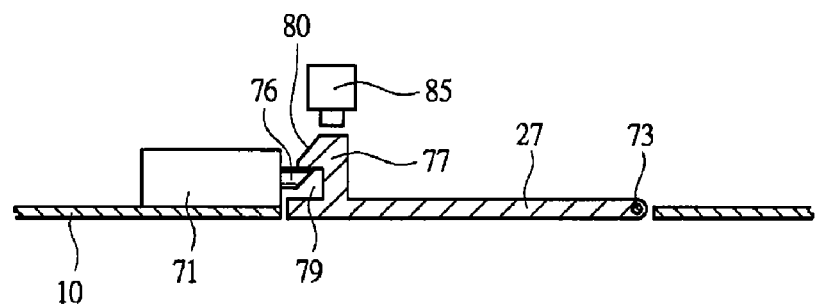
FIGS. 6A to 6D are sectional views showing a procedure for opening and closing a lid member in an electric vehicle according to another embodiment of the present invention.
Figure 6:
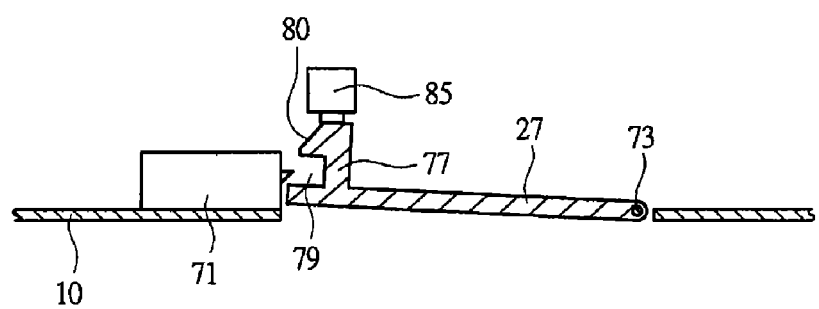
Figure 6:
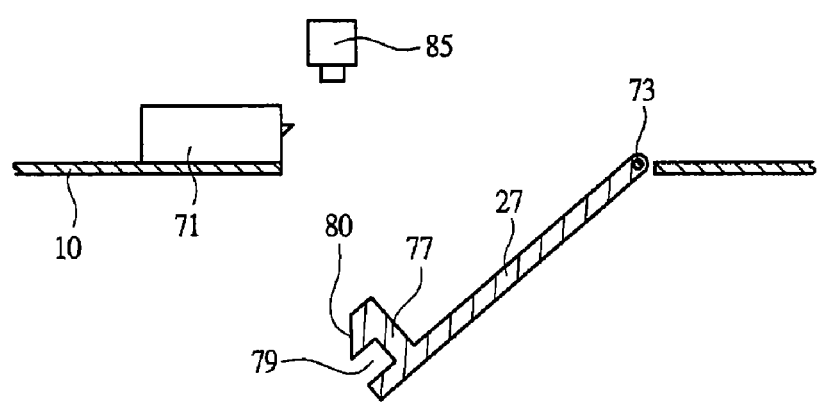
Figure 6:
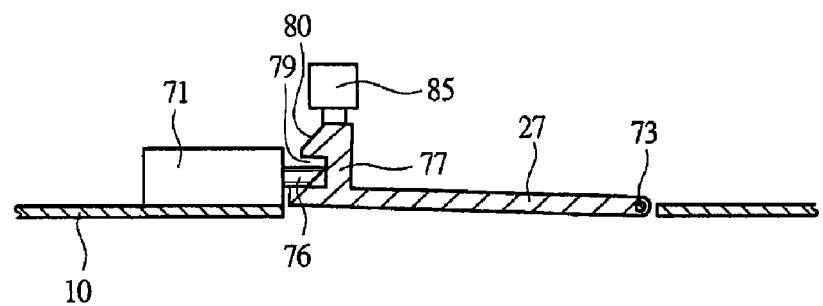
Figure 7:
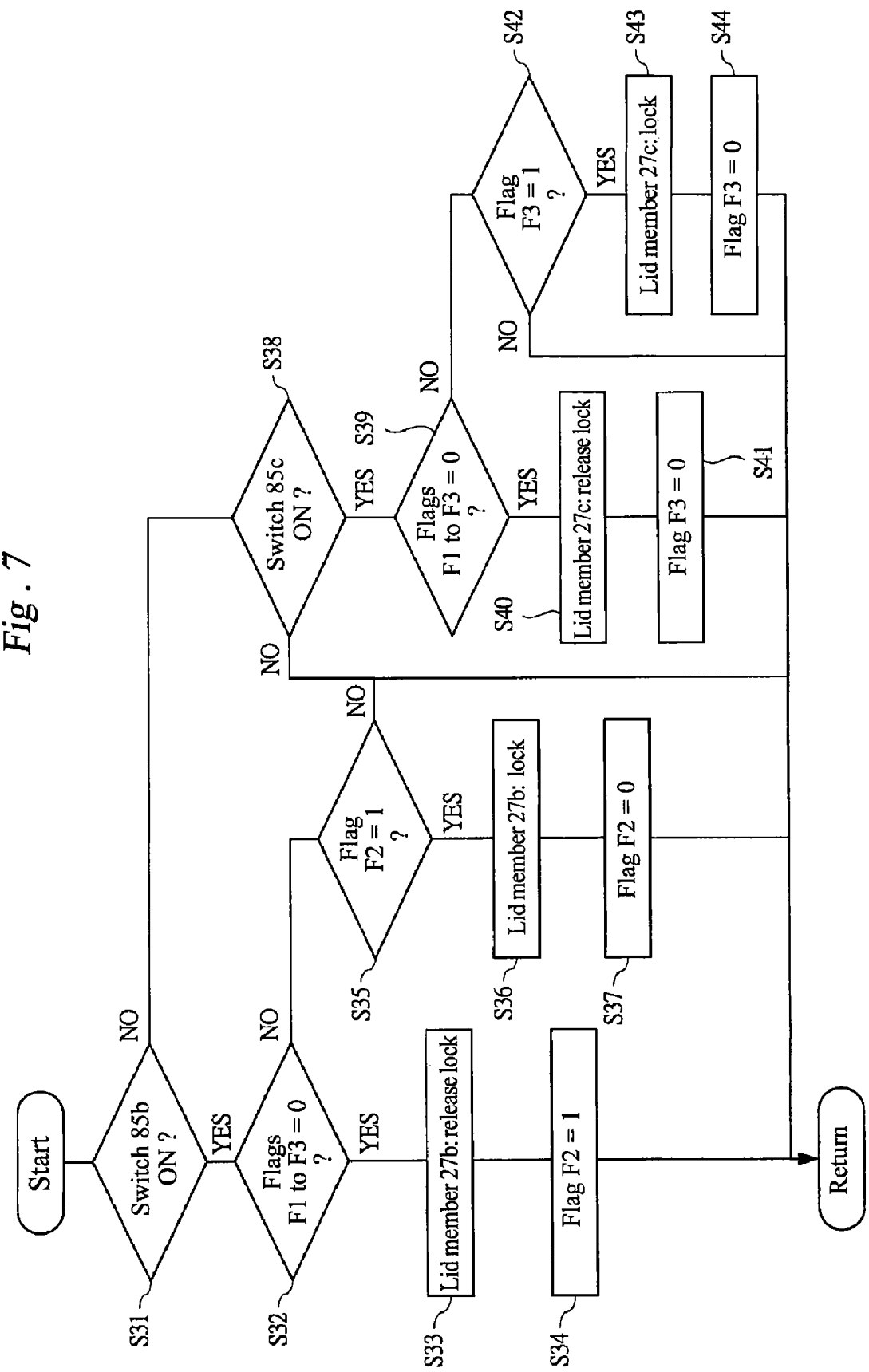
FIG. 7 is a flowchart showing an algorithm for releasing closure in an embodiment where closure is released from the exterior.

FIG. 7 is a flowchart showing an algorithm for releasing closure in an embodiment where closure of the lid members 27*b*, 27*c* provided on the two charging ports 40, 60 is released from the exterior, as shown in FIG. 6. Note that the open/close release procedure for the lid member 27*a* of the fuel supply port 25 is similar to that described in the steps S1 to S7 of FIG. 5, and therefore this procedure is not illustrated in FIG. 7.

When the lid member 27*b* is pushed inward as shown in FIG. 6B to charge the high voltage battery 30 by opening the fast charging port 40, the open/closed detection switch 85*b* is determined to be ON in a step 31. When all of the lid members 27*a* to 27*c* are in a closed state and it is determined in a step S32 that all of the flags F1 to F3 are at 0, power is supplied to the coil of the lock mechanism 71*b* in a step S33, causing the lock rod 76 to retreat. As a result, the lock on the lid member 27*b* is released, and therefore the flag F2 is set at 1 in a step S34. When the lock is released, the charging port 40 is opened, as shown in FIG. 6C. The power supply plug 47 is then attached to the connector 43 such that the high voltage battery 30 is charged by the fast charger 51.

When the lid member 27*b* is pushed inward as shown in FIG. 6D to close the charging port 40 upon completion of the charging operation, YES is determined in a step S35. As a result, power supply to the coil 75 of the lock mechanism 71*b* is halted, thereby locking the lid member 27*b*, and the flag F2 is set at 0 (steps S36, S37).

Meanwhile, when the lid member 27*c* is pushed inward to open the normal charging port 40 so that the high voltage battery 30 can be charged via the on-board charger 35, the open/closed detection switch 85*c* is determined to be ON in a step S38. When it is determined in a step S39 that all of the flags F1 to F3 are at 0, power is supplied to the coil of the lock mechanism 71*c* in a step S40, causing the lock rod 76 to retreat. As a result, the lock on the lid member 27*c* is released, and therefore the flag F3 is set at 1 in a step S41. When the lock is released, the charging port 60 opens. The power plug 65 is then attached to the connector 62 to charge the high voltage battery 30 using a residential commercial power source. When the charging port 60 is closed upon completion of the charging operation, steps S42 to S44 are executed, whereby the flag F3 is set at 0.

In this embodiment, the fuel supply port 25 is opened from the interior of the vehicle cabin, whereas the charging ports 40, 60 are opened from the exterior of the vehicle. Hence, in a vehicle having the lid member shown in FIG. 6, opening operation means for releasing closure of the lid member on the basis of a signal from the open/closed detection switch 85 using the lock mechanism 71 is constituted by the opening control unit 72. Note that the fuel supply port 25 may also be opened from the exterior of the vehicle cabin.

Third Embodiment

As shown in FIG. 5, when closure of the lid member 27 is released by pushing the lid member 27 inward from the vehicle exterior, the closure release operation can be performed easily. In this embodiment, a keyless entry system may be applied to the operation for releasing closure of the lid member to prohibit inadvertent closure release operations from the exterior.

A system in which a door or a trunk is locked and unlocked upon reception of radio waves from a transmitter without touching the vehicle is known as a keyless entry system. The transmitter is incorporated into a key or a card, and locking and unlocking operations are performed by operating the transmitter within a signal reception area of a receiver. When the transmitter, which is held by a passenger, is present within the signal reception area of the receiver, a signal is transmitted to the opening control unit 72 from a reception antenna 95, as shown in FIG. 1, whereby the opening control unit 72 determines that the passenger is within the signal reception area. Hence, an operation to release closure of the lid member 27 from the vehicle exterior is permitted only when the reception antenna 95 receives a signal.

In this embodiment, the lid member is opened only when the passenger is in or near the vehicle, and therefore inadvertent opening operations from the exterior of the vehicle are prohibited.

The present invention is not limited to the above embodiments, and may be subjected to various modifications within a scope that does not depart from the spirit thereof. For example, FIG. 1 shows a plug-in type electric vehicle in which the engine 11 and the electric motor 12 are installed in the vehicle body 10 as drive sources and the vehicle body 10 is provided with the fuel supply port 25 and the plurality of charging ports 40, 60, but the present invention may be applied to an electric vehicle having an electric motor alone as a drive source and a plurality of charging ports. The lock mechanisms 71a to 71d for maintaining the lid members in a closed state employ a rod as a core and a solenoid having a coil for operating the rod, but the lock mechanisms 71a to 71d may employ an electric motor or the like as a drive source, providing that the drive source is of a type that drives a member such as a lock rod that engages with the lid member.

What is claimed is:

1. An electric vehicle having a plurality of energy supply ports forming a charging port for supplying electric energy to a battery or a fuel supply port for supplying fuel to a fuel tank, lid members for respectively opening and closing said energy supply ports being provided in a vehicle body, said electric vehicle comprising:

a plurality of lock mechanisms for respectively switching said lid members between a closed state and an open state;

an opening operation device releasing closure of said lid member using said lock mechanism; and an opening control device prohibiting remaining lid members from being switched to the open state when closure of one of said lid members has been released, wherein, of said plurality of energy supply ports, the number of said energy supply ports simultaneously having an open lid member is limited to one.

2. The electric vehicle according to claim 1, wherein said charging port and said fuel supply port are provided in said vehicle body, said opening operation device releasing the closed state of said lid member provided on said fuel supply port is provided in a vehicle cabin, and said opening control device switches said lock mechanism to the open state when a closure release operation is performed on said lid member of said charging port from a vehicle exterior, whereby said fuel supply port is opened from a vehicle interior and said charging port is opened from said vehicle exterior.

3. The electric vehicle according to claim 1, wherein at least one of said plurality of energy supply ports is a charging port, said lid member of said charging port is opened when said lid member is pushed inward, and said lid member is held in the closed state by performing an operation to push said lid member inward from the open state.

4. The electric vehicle according to claim 1, comprising a receiver for receiving a signal from a transmitter held by a passenger and transmitting said received signal to said opening control device, wherein opening of said lid member is permitted only when said transmitter is within a signal reception area of said receiver.

* * * * *